April 16, 1963 J. O. SARTO 3,085,558
PREHEATER FOR CARBURETOR INLET AIR
Filed May 1, 1961 2 Sheets-Sheet 1
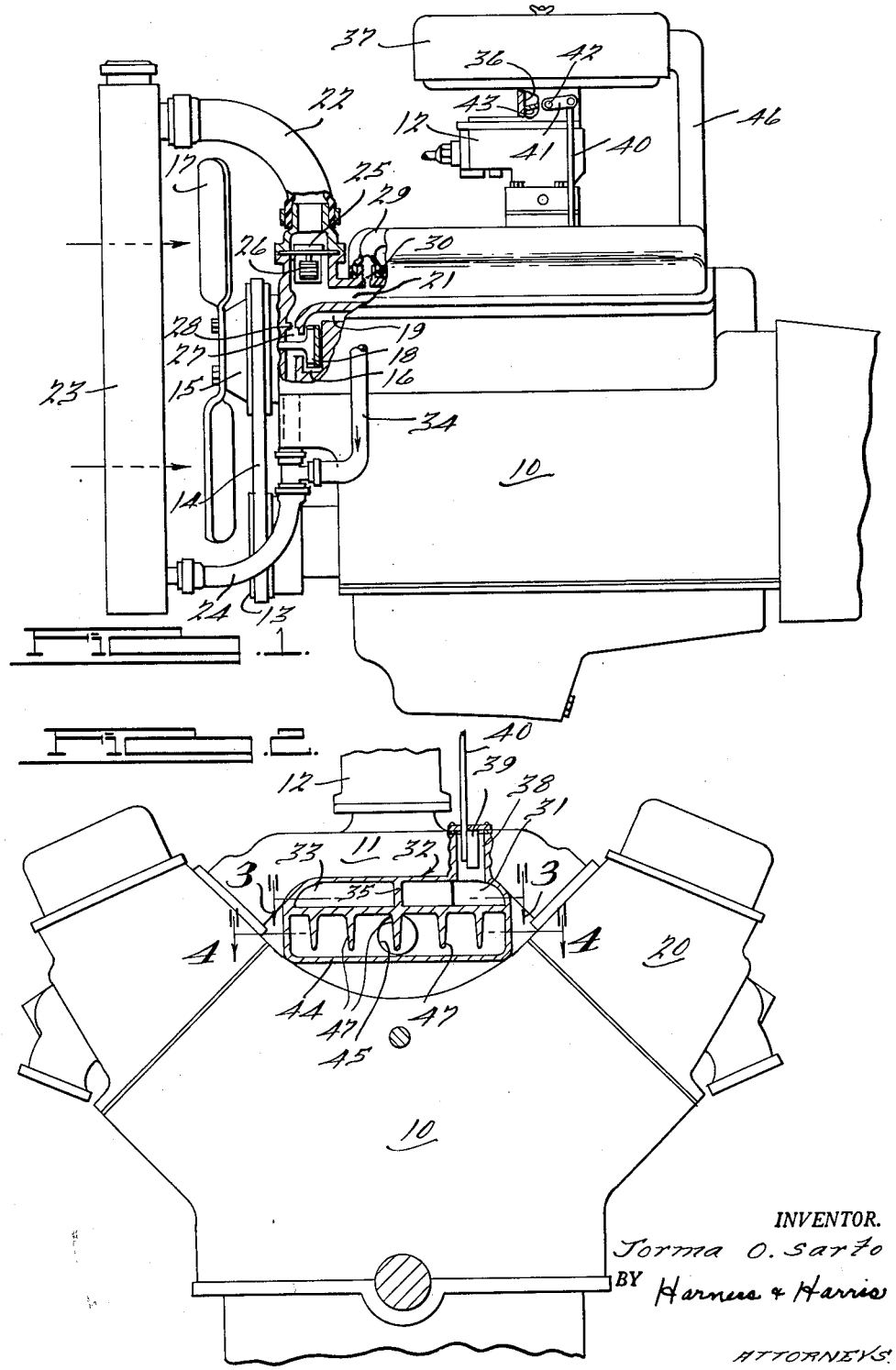
INVENTOR.
Jorma O. Sarto
BY Harness & Harris
ATTORNEYS

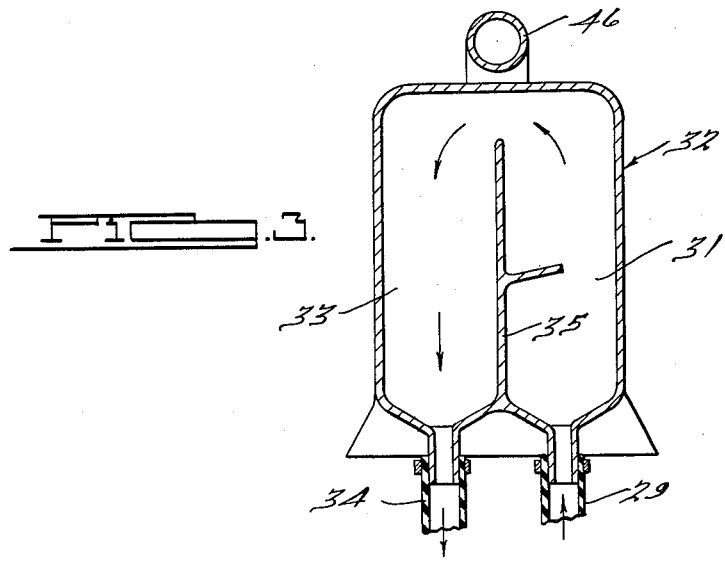
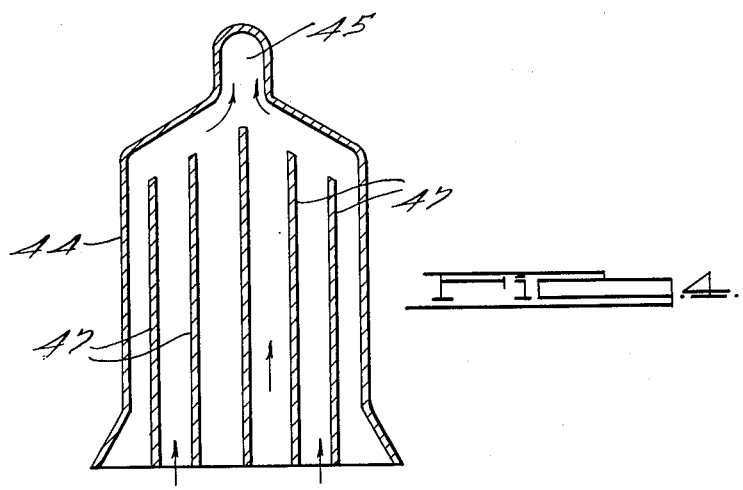

United States Patent Office 3,085,558
Patented Apr. 16, 1963

3,085,558
PREHEATER FOR CARBURETOR INLET AIR
Jorma O. Sarto, Orchard Lake, Mich., assignor to Chrysler Corporation, Highland Park, Mich., a corporation of Delaware
Filed May 1, 1961, Ser. No. 106,688
9 Claims. (Cl. 123—122)

This invention relates to preheating of the inlet air for an internal combustion engine and has for an important object the provision of improved and simple means for preheating the inlet combustion supporting air to achieve a substantially uniform inlet air temperature regardless of the ambient air temperature.

During cold and particularly during cool, damp weather below approximately 40° F. the fast idle cam of the conventional carburetor is effective to hold the throttle valve at a partially open fast idle condition for a predetermined engine warmup period. Small ice particles are thus enabled to pass through the throttle valve without causing icing problems. After the warmup period, the fast idle cam is no longer effective to hold the throttle open, so that icing becomes a serious problem during engine idling unless supplemental preheating of the inlet air is provided.

Various systems have been proposed heretofore for preheating the carburetor inlet air by means of the engine water coolant or the exhaust gases. Such systems, however, in order to operate effectively and with safety have required thermostat controls and valving, especially to prevent overheating of cast aluminum engines where exhaust gas preheating is employed. The additional expense and problems of servicing that arise from such systems have prevented their universal adoption. In addition, the use of the engine coolant water as customarily proposed has been unsatisfactory for preheating during the warmup stage because such water itself during cold weather is too cold for preheating purposes for several minutes after the fast idle cam becomes ineffective.

Another object of the invention is therefore to provide simple, improved and highly efficient means for utilizing the engine coolant water for carburetor air preheating, without recourse to auxiliary valving and temperature control means, and which enables sufficiently rapidly preheating of the inlet air so as to be effective to avoid icing and other cold weather problems by the time the customary carburetor fast idle cam becomes ineffective to hold the throttle valve open during engine idling.

It is customary in engine coolant systems to provide an engine driven pump for circulating a liquid coolant such as water through a coolant duct system in the side walls of the engine. A thermostatically actuated valve which is normally closed when the engine is cold controls the flow of coolant through an air cooled radiator arranged in series with the engine coolant duct system. In order to enable circulation of the coolant water when the valve is closed, a restricted bypass duct is connected between the pump inlet and the return side of the coolant duct system.

Another and more specific object of the present invention is to provide an improved carburetor air inlet preheating system wherein the inlet air passes first through an air preheating collector in heat exchange relation with both the engine and a restricted preheating duct arranged in parallelism with the aforesaid restricted bypass duct to conduct the liquid coolant from the return side of the coolant duct system to the pump inlet.

By virtue of this construction, the inlet air is brought into heat exchange relationship with a portion of the fluid coolant which would otherwise circulate through the bypass duct. Inasmuch as the mass of the fluid coolant circulating in the engine side walls by means of the bypass duct prior to opening of the thermostatically actuated valve to the radiator is comparatively small, this coolant in the engine side walls is heated rapidly and is effective for preheating purposes before the customary fast idle cam becomes ineffective and appreciably before the thermostatically actuated radiator valve opens to connect the main body of coolant water with the engine coolant duct system. Accordingly, during the time after the fast idle cam becomes ineffective and prior to the time that the main body of radiator water is heated sufficiently for preheating the carburetor inlet air, the foregoing structure enables effective preheating to facilitate precise determination of the fuel-air mixture regardless of the ambient temperature and to prevent icing during cold or damp weather. The advantages derived from the present construction are accomplished by means of the customary thermostatically actuated flow control valve for the radiator, so that supplementary temperature responsive means for the preheating system is unnecessary.

Another object is to provide a preheating system of the above character which is particularly suitable for use with V-type cast aluminum engines.

Other objects of this invention will appear in the following description and appended claims, reference being had to the accompanying drawings forming a part of this specification wherein like reference characters designate corresponding parts in the several views.

FIGURE 1 is a schematic side elevational view of an engine embodying the present invention, portions being broken away to illustrate details of construction.

FIGURE 2 is a front elevational view of the structure of FIGURE 1 with the radiator and fan removed.

FIGURE 3 is a horizontal sectional view through the bypass water preheater, taken in the direction of the arrows substantially along the line 3—3 of FIGURE 2.

FIGURE 4 is a horizontal sectional view through the inlet air collector taken in the direction of the arrows substantially along the line 4—4 of FIGURE 2.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, an embodiment of the present invention is illustrated by way of example in a V-type multi-cylinder automobile engine 10 wherein an air intake header or manifold 11 mounted within the V-gap of the engine and bridging the latter supplies a combustion supporting fuel-air mixture from a carburetor 12 to the various cylinders of the engine. An engine driven pulley 13 is connected by means of a belt 14 with a pulley 15 for a fan 17 and coaxial water pump 18. The latter comprises a bladed impeller rotatable within a pumping chamber 16 in the side wall of the engine 10 to discharge water or other coolant to the intake of a coolant system 19 also formed in the engine side walls particularly at the region of the customary cylinder head 20. The liquid coolant is circulated within the coolant system 19 by reason of the pressure of pump 18 and is discharged at 21 to a radiator inlet hose 22. The latter is connected with a radiator 23 in heat exchange relation with atmospheric air so as to cool the water heated by the engine 10. The cooled radiator water is returned by means of hose 24 to the pumping chamber 16 at the inlet side of pump 18, whereby the coolant is recirculated through the system 19.

A thermostatic element 26 at the upstream end of hose 22 is operably connected with a radiator control valve 25 to hold the latter normally closed until the liquid coolant upstream of valve 25 attains a predetermined desired operating temperature. In order to enable a limited circulation of coolant through pump 18 when valve 25 is closed, a bypass duct 27, restricted at 28, connects the outlet side of the coolant system 19 with the pump inlet side of chamber 16. The structure thus far described may be conventional and is accordingly not illustrated in further detail. Briefly, during operation of the engine, the fan 17 draws atmospheric air in the direction of the arrows through the matrix of the radiator 23, whereby the radiator water is cooled and the air passing therethrough is preheated and eventually admixed with fuel and conducted to the engine as described below.

A second bypass conduit 29 is restricted at 30 and arranged in parallelism with bypass duct 27 to conduct coolant from the discharge 21 of system 19 to the inlet side 31 of a preheater 32 located in heat exchange relation with the underside of manifold 11 so as to heat the fuel-air mixture therein prior to its discharge into the engine cylinders. The preheater 32 is provided with an outlet 33 in communication with the radiator return flow hose 24 by means of hose 34. As illustrated in FIGURES 2 and 3, the preheater 32 is arranged substantially flat and its inlet and outlet sides 31 and 33 are spaced in side-by-side relationship by means of a suitable baffle 35.

In accordance with the structure described, while the engine is operating during the warmup period prior to opening of thermostatically actuated valve 25, the coolant discharged from pump 18 circulates through the system 19 and is discharged therefrom at 21, from whence the coolant flows in parallelism through the bypass ducts 27 and 29 in proportions determined by the respective restrictions 28 and 30. Coolant flowing through conduit 29 is discharged into the inlet side of preheater 32 and is returned from the outlet side 33 via conduit 34 to the return side of pump 18. The flow of coolant in preheater 32 prior to opening of thermostatically actuated valve 25 carries heat from the engine 10 into heat exchange relation with the manifold 11, whereby the fuel-air mixture is preheated as it flows from the customary carburetor induction conduit or air horn 36 and filter 37 into the engine cylinders.

As illustrated in FIGURE 2, a pocket 38 is formed in the preheater 32 in communication with the hot water inlet side 31 and contains a thermostat element 39 operatively connected by means of rod 40 with one end of the choke valve operating lever 41. The other end of lever 41 is keyed to a pivotal choke valve shaft 42 supported by carburetor 12 and to carry a conventional butterfly choke valve 43. The thermostat element 39 is arranged to urge valve 43 yieldingly closed with progressively increasing force as the engine temperature falls. Thus after the engine is initially started and is idling in the cold condition, choke valve 43 will be substantially closed to assure an enriched fuel mixture in accordance with the operation of a conventional carburetor. During this condition, valve 25 will also be closed, so that only a small portion of the water in the engine cooling system will be circulating through system 19. In consequence, this portion of the coolant water will be warmed rapidly by the engine heat and will be effective to provide preheating of the inlet fuel-air mixture flowing through header or manifold 11. During this time, the customary fast idle cam of the carburetor will be effective to maintain the throttle valve cracked slightly open at a fast idle condition to assure efficient idling and to prevent icing. As the engine warms to enable relaxation of the force of the thermostat element 39 urging choke valve 43 closed, so that the latter progressively opens, the fast idle cam also becomes ineffective to maintain the throttle at the fast idle condition. Shortly thereafter, valve 25 normally opens fully to enable circulation of the entire body of the coolant contained in radiator 23 through the engine cooling system 19. The radiator 23 then becomes effective as a preheater for the carburetor air.

During extremely cold weather, as for example below approximately 15° F., there is a delay mounting to several minutes of idling or several miles of driving between the termination of the fast idle condition and the time that radiator 23 becomes effective for preheating the carburetor inlet air. In consequence, without some provision to the contrary, thermostat element 39 responsive to the warm coolant in preheater 32 enables opening of choke valve 43 to a condition for receiving preheated inlet air, whereas in fact the air entering through radiator 23 is not sufficiently preheated. Inefficient engine operation with frequent icing and stalling results.

In order to avoid such problems at very low ambient temperatures, an air collector 44 is provided in the V of the engine 10 immediately below the preheater 32, the collector 44 having a forward opening confronting radiator 23 to receive inlet atmospheric air therefrom as the latter is blown rearwardly by fan 17. Rearwardly, the collector 44 converges to an outlet 45 connected with an upriser 46 which discharges into the carburetor air filter 37. The filtered air is then directed downwardly through the induction conduit 36 of the carburetor to the manifold 11 and cylinders of the engine 10. In order to achieve efficient heat transfer, a number of fins 47 extend from the base of the preheater 32 into the collector 44. Thus the cold air entering collector 44 prior to opening of radiator control valve 25 is heated from above by the coolant in preheater 32 and from below by radiation from the engine 10 to a temperature sufficient to prevent icing at the throttle valve during the interval between the termination of the fast idle condition and the time required to open valve 25 and heat the main body of water in the radiator 23.

In accordance with the structure shown, the body of the fluid engine coolant is maintained at substantially a uniform temperature by means of thermostat 26 after the engine has attained its equilibrium operating temperature, so that the inlet air entering via collector 44 and upriser 46 is maintained at a uniform temperature the year around regardless of the temperature of the ambient air. Accordingly, the carburetor 12 can be adjusted to provide an optimum fuel-air mixture the year around. Also by using the liquid coolant in system 21 for preheating, instead of the exhaust gases, the structure described can be used with a cast aluminum engine housing because the corrosive action that would result from such gases in contact with the aluminum engine is avoided. In addition, by using the liquid coolant for preheating as disclosed, it is apparent that the thermostat 26 already in conventional use also serves to control the temperature of the coolant in preheater 32, so that a supplemental thermostat and other valving are avoided.

I claim:

1. In combination with an internal combustion engine having a liquid coolant system, fuel charging means having an inlet air passage means connected with said engine to discharge combustion supporting air thereto, pump means for circulating liquid coolant through said system, means for cooling the coolant discharged from said system comprising heat exchange means connected with the outlet side of said system, said heat exchange means being also connected with the return side of said pump means to return cooled coolant thereto, thermostatically actuated valve means in the connection between said system and heat exchange means to regulate the coolant flow therebetween, bypass duct means connecting the outlet side of said system with the return side of said pump means to enable circulation of said coolant through said system when said valve means is closed, said bypass duct means including a second heat exchange means in heat exchange relation with said inlet air passage means to preheat said combustion supporting air prior to its discharge into said engine, a choke valve in said inlet air passage means, and thermostatic means responsive to the temperature of the coolant in said second heat exchange means for yieldingly urging closing of said choke valve with increasing force as the temperature of said coolant decreases.

2. In combination with an internal combustion engine having a liquid coolant system, fuel charging means having an inlet air passage means connected with said engine to discharge combustion supporting air thereto, pump means for circulating liquid coolant through said system, means for cooling the coolant discharged from said system comprising heat exchange means connected with the outlet side of said system, said heat exchange means being also connected with the return side of said pump means to return cooled coolant thereto, thermostatically actuated valve means in the connection between said system and heat exchange means to regulate the coolant flow therebetween, bypass duct means connecting the outlet side of said system with the return side of said pump means to enable circulation of said coolant through said system when said valve means is closed, said bypass duct means including a second heat exchange means in heat exchange relation with said inlet air passage means to preheat said combustion supporting air prior to its discharge into said engine, second bypass duct means connecting the outlet side of said system with the return side of said pump means for conducting coolant in parallelism with the first named bypass duct means, each of said bypass duct means having a restriction therein dimensioned to prorate the coolant flow therethrough.

3. In combination with a multiple cylinder internal combustion engine having a liquid coolant system, fuel charging means having an inlet air passage means connected with said engine, said inlet air passage means including a manifold spaced from said engine and having separate ducts connected with the cylinders respectively of said engine, to discharge combustion supporting air thereto, pump means for circulating liquid coolant through said system, means for cooling the coolant discharged from said system comprising heat exchange means connected with the outlet side of said system, said heat exchange means being also connected with the return side of said pump means to return cooled coolant thereto, thermostatically actuated valve means in the connection between said system and heat exchange means to regulate the coolant flow therebetween, bypass duct means connecting the outlet side of said system with the return side of said pump means to enable circulation of said coolant through said system when said valve means is closed, said bypass duct means including a second heat exchange means located between said manifold and engine in heat exchange relation with said inlet air passage means to preheat said combustion supporting air prior to its discharge into said engine.

4. The combination according to claim 3 wherein said air inlet passage includes an air preheating collector adjacent its inlet end arranged between and in heat exchange relation with both said second heat exchange means and engine.

5. The combination according to claim 3 wherein said engine is of the V-type, said manifold bridging the V of said engine, said second heat exchange means being located in the V of said engine in juxtaposition with said manifold between the latter and engine, and said collector being located in said V in juxtaposition with said second heat exchange means between the latter and engine.

6. The combination according to claim 3 wherein said engine is of the V-type, said manifold bridging the V of said engine, said second heat exchange means being located in the V of said engine in juxtaposition with said manifold between the latter and engine, and said collector being located in said V in juxtaposition with said second heat exchange means between the latter and engine, said combination also including a choke valve in said inlet air passage means, and thermostatic means responsive to the temperature of the coolant in said second heat exchange means for yieldingly urging closing of said choke valve with increasing force as the temperature of said coolant decreases.

7. In combination with an internal combustion engine having a liquid coolant system, fuel charging means having an inlet air passage means connected with said engine to discharge combustion supporting air thereto, pump means for circulating liquid coolant through said system, means for cooling the coolant discharged from said system comprising heat exchange means connected with the outlet side of said system, said heat exchange means being also connected with the return side of said pump means to return cooled coolant thereto, thermostatically actuated valve means in the connection between said system and heat exchange means to regulate the coolant flow therebetween, bypass duct means connecting the outlet side of said system with the return side of said pump means to enable circulation of said coolant through said system when said valve means is closed, said bypass duct means including a second heat exchange means in heat exchange relation with said inlet air passage means to preheat said combustion supporting air prior to its discharge into said engine, a choke valve in said inlet air passage means, thermostatic means responsive to the temperature of the coolant in said second heat exchange means for yieldingly urging closing of said choke valve with increasing force as the temperature of said coolant decreases, second bypass duct means connecting the outlet side of said system with the return side of said pump means for conducting coolant in parallelism with the first named bypass duct means, and means restricting the coolant flow in each of said bypass duct means to prorate the coolant flow therethrough.

8. In combination with a multiple cylinder internal combustion engine having a liquid coolant system, fuel charging means having an inlet air passage means connected with said engine, said inlet air passage means including a manifold adjacent its discharge end spaced from said engine and having separate ducts connected with the cylinders respectively of said engine, said inlet air passage means also including an air preheating collector adjacent its inlet end and arranged between and in heat exchange relation with both said second heat exchange means and engine, to discharge combustion supporting air thereto, pump means for circulating liquid coolant through said system, means for cooling the coolant discharged from said system comprising heat exchange means connected with the outlet side of said system, said heat exchange means being also connected with the return side of said pump means to return cooled coolant thereto, thermostatically actuated valve means in the connection between said system and heat exchange means to regulate the coolant flow therebetween, bypass duct means connecting the outlet side of said system with the return side of said pump means to enable circulation of said coolant through said system when said valve means is closed, said bypass duct means including a second heat exchange means located between said manifold and engine in heat exchange relation with said inlet air passage means to preheat said combustion supporting air prior to its discharge into said engine, a choke valve in said inlet air passage means, thermostatic means responsive to the temperature of the coolant in said second heat exchange means for yieldingly urging closing of said choke valve with increasing force as the temperature of said coolant decreases, second bypass duct means connecting the outlet side of said system with the return side of said pump means for conducting coolant in parallelism with the first named bypass duct means, and means restricting the coolant flow in each of said bypass duct means to prorate the coolant flow therethrough.

9. The combination according to claim 8 wherein said engine is of the V-type, said manifold bridging the V of said engine, said second heat exchange means being located in the V of said engine in juxtaposition with said manifold between the latter and engine, and said collector being located in said V in juxtaposition with said second heat exchange means between the latter and engine.

References Cited in the file of this patent

UNITED STATES PATENTS 2,369,937     Baster _____ Feb. 20, 1945